US008165614B2

(12) United States Patent
Adkins (10) Patent No.: US 8,165,614 B2
(45) Date of Patent: *Apr. 24, 2012

(54) TRANSMITTER CONTROLLED COMMUNICATION LINKS

(75) Inventor: Kevin G Adkins, Akron, OH (US)

(73) Assignee: Turning Technologies, LLC, Youngstown, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/539,750

(22) Filed: Aug. 12, 2009

(65) Prior Publication Data

US 2009/0298442 A1 Dec. 3, 2009

Related U.S. Application Data

(63) Continuation of application No. 11/336,362, filed on Jan. 20, 2006.

(60) Provisional application No. 60/645,021, filed on Jan. 21, 2005.

(51) Int. Cl.
*H04B 7/00* (2006.01)

(52) U.S. Cl. ........................................ 455/500; 455/416

(58) Field of Classification Search .................. 455/571, 455/572, 573, 575.1, 90.3, 92, 95, 103, 73; 429/99; 434/322, 332, 350, 362; 375/259, 375/295, 316
See application file for complete search history.

(56) References Cited

U.S. PATENT DOCUMENTS

| 4,442,939 A | 4/1984 | Downing |
| 4,975,952 A * | 12/1990 | Mabey et al. ................. 713/160 |
| 5,093,786 A * | 3/1992 | Derks .......................... 455/3.01 |
| 5,142,550 A | 8/1992 | Tymes |
| 5,226,177 A * | 7/1993 | Nickerson ....................... 725/24 |
| 5,379,213 A | 1/1995 | Derks |
| RE35,449 E | 2/1997 | Derks |
| 5,610,595 A | 3/1997 | Garrabrant et al. |
| 5,724,357 A | 3/1998 | Derks |
| 5,823,788 A | 10/1998 | Lemelson et al. |
| 5,842,181 A | 11/1998 | Fanjoy |
| 5,982,742 A | 11/1999 | Leung et al. |
| 6,011,578 A | 1/2000 | Shatto et al. |
| 6,021,119 A | 2/2000 | Derks et al. |
| 6,030,266 A | 2/2000 | Ida et al. |

(Continued)

FOREIGN PATENT DOCUMENTS

EP 0843432 A3 12/1999

(Continued)

OTHER PUBLICATIONS

Statement of Related Litigation, Jun. 24, 2010.

(Continued)

*Primary Examiner* — Jean Gelin
(74) *Attorney, Agent, or Firm* — Benesch Friedlander Coplan & Arnoff LLP (57) ABSTRACT

A wireless communication system is disclosed herein. The wireless communication system may include transmitter units and a receiver. In one embodiment, each transmitter has an address and logic programmed to perform the steps of receiving a user selection and, responsive to the receiving, repeatedly transmitting a wireless selection signal until a wireless acknowledgment signal is received. The wireless selection signal may include the address and the user selection. The receiver may include means to receive a wireless selection signal and logic programmed to transmit a wireless acknowledgment signal in response to the receipt of each wireless selection signal.

19 Claims, 7 Drawing Sheets

U.S. PATENT DOCUMENTS

| | | | |
|---|---|---|---|
| 6,031,522 | A | 2/2000 | Strand |
| 6,086,382 | A | 7/2000 | Thomas |
| 6,101,367 | A | 8/2000 | Luciano |
| 6,160,719 | A | 12/2000 | May et al. |
| 6,181,910 | B1 | 1/2001 | Jerrold-Jones et al. |
| 6,256,399 | B1 | 7/2001 | Poor |
| 6,289,222 | B1 | 9/2001 | Cue et al. |
| 6,298,347 | B1 | 10/2001 | Wesley |
| 6,321,188 | B1 | 11/2001 | Hayashi et al. |
| 6,370,018 | B1 | 4/2002 | Miller, Jr. et al. |
| 6,466,683 | B1 | 10/2002 | Poor |
| 6,491,525 | B1 | 12/2002 | Hersh |
| 6,514,084 | B1 | 2/2003 | Thomas |
| 6,558,166 | B1 | 5/2003 | Clark et al. |
| 6,571,299 | B1 | 5/2003 | Schroyer et al. |
| 6,661,350 | B1 | 12/2003 | Rohrberg et al. |
| 6,665,000 | B1 | 12/2003 | Buchler et al. |
| 6,675,133 | B2 | 1/2004 | Knowles et al. |
| 6,749,435 | B2 | 6/2004 | Clark et al. |
| 6,751,351 | B2 | 6/2004 | Knowles et al. |
| 6,784,748 | B1 | 8/2004 | Canyon et al. |
| 6,793,129 | B2 | 9/2004 | Wood et al. |
| 6,810,232 | B2 | 10/2004 | Knowles et al. |
| 6,834,285 | B1 | 12/2004 | Boris et al. |
| 6,847,626 | B1 | 1/2005 | Carneal et al. |
| 6,895,213 | B1 | 5/2005 | Ward |
| 7,277,671 | B2 | 10/2007 | Glass et al. |
| 7,330,716 | B2 | 2/2008 | Adkins |
| 7,715,780 | B1 | 5/2010 | Beamish et al. |
| 2002/0062276 | A1* | 5/2002 | Krueger et al. ............. 705/37 |
| 2003/0153263 | A1 | 8/2003 | Glass et al. |
| 2003/0153321 | A1 | 8/2003 | Glass et al. |
| 2003/0153347 | A1 | 8/2003 | Glass et al. |
| 2003/0174779 | A1* | 9/2003 | Sugaya et al. ............. 375/259 |
| 2003/0215780 | A1* | 11/2003 | Saar et al. ............... 434/351 |
| 2003/0236891 | A1 | 12/2003 | Glass et al. |
| 2004/0033478 | A1 | 2/2004 | Knowles et al. |
| 2004/0229642 | A1 | 11/2004 | Derks et al. |
| 2005/0030964 | A1* | 2/2005 | Tiedemann et al. ......... 370/431 |
| 2005/0244803 | A1 | 11/2005 | Brown et al. |
| 2006/0072497 | A1 | 4/2006 | Buehler et al. |
| 2007/0042724 | A1 | 2/2007 | Derks |
| 2007/0064902 | A1 | 3/2007 | Glass et al. |
| 2008/0108298 | A1 | 5/2008 | Selen et al. |

FOREIGN PATENT DOCUMENTS

| | | |
|---|---|---|
| EP | 0697773 B1 | 9/2002 |
| EP | 1337127 A1 | 8/2003 |
| EP | 1427228 A3 | 9/2004 |
| JP | 61-280129 | 12/1986 |
| JP | 2002368679 | 12/2002 |
| JP | 2003018306 | 1/2003 |
| WO | 2004017662 | 2/2004 |

OTHER PUBLICATIONS

U.S. Appl. No. 60/595,932; Asynchronous Response System with Acknowledge; Derks, Harry, G.; filed Aug. 18, 2005.

U.S. Office Action; U.S. Appl. No. 11/336,362, filed Jan. 20, 2006; Apr. 12, 2010.

U.S. Office Action; U.S. Appl. No. 12/029,962, filed Dec. 12, 2008; Dec. 22, 2009.

U.S. Office Action; U.S. Appl. No. 11/336,362, filed Jan. 20, 2006; Sep. 25, 2009.

U.S. Office Action; U.S. Appl. No. 11/336,362, filed Jan. 20, 2006; Jan. 13, 2009.

U.S. Office Action; U.S. Appl. No. 11/336,362, filed Jan. 20, 2006; Jul. 14, 2008.

U.S. Office Action; U.S. Appl. No. 11/336,362, filed Jan. 20, 2006; May 5, 2008.

U.S. Office Action; U.S. Appl. No. 11/336,362, filed Jan. 20, 2006; Oct. 19, 2007.

U.S. Office Action; U.S. Appl. No. 11/336,361, filed Jan. 20, 2006; Oct. 11, 2007.

U.S. Office Action; U.S. Appl. No. 11/336,362, filed Jan. 20, 2006; May 21, 2007.

U.S. Office Action; U.S. Appl. No. 11/336,361, filed Jan. 20, 2006; May 17, 2007.

RI Request for Quotation (RI002619-RI002623); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Nov. 2004 (5 pages).

Nordic Sample Code (CA000233); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; 2004 (43 pages). The year of publication is sufficiently earlier than the effective U.S. filng date and any priority date so that the particular month of publication is not in issue. See MPEP 609.04(a).

T. Rappaport; Wireless Communications: Principles & Practice, (Prentice Hall, 1996) (HP031087-HP031094); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; 2004 (8 pages). The year of publication is sufficiently earlier than the effective U.S. filed and any priority date so that the particular month of publication is not in issue. See MPEP 609.04(a).

Keychain Remote KR22A Installation and Operating Instructions, KR22A-3/99, from FFC (HP031096); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Mar. 1999 (1 page).

A. Leon-Garcia and I. Widjaja., Communication Networks, (McGraw-Hill, 2000), Chapter 6 (HP030966-HP030979); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; (12 pages). The year of publication is sufficiently earlier than the effective U.S. filed and any priority date so that the particular month of publication is not in issue. See MPEP 609.04(a).

HP030988; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; 2004 (1 page). The year of publication is sufficiently earlier than the effective U.S. filed and any priority date so that the particular month of publication is not in issue. See MPEP 609.04(a).

M. Schwartz, telecommunication Networks, (Addison-Wesley Publishing Co., 1987), (HP031078-HP031086); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; (9 pages) The year of publication is sufficiently earlier than the effective U.S. filed and any priority date so that the particular month of publication is not in issue. See MPEP 609.04(a).

KR22A Block Diagram Form from FCC (HP031095); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Sep. 30, 1999 (1 page).

USA Keychain Remote KR22A Electrical Schematic, Sep. 24, 1999, from FCC (HP031097);*Responsive Innovations, LLC* and *Turning Technologies, LLC* v. *Holtzbrinck Publishers, LLC* and *MacMillan Publishers, Inc.* ND Ohio ED, 4:08-cv-01184-PCE; (1 page).

Meet the Zigbee Standard (Sensormag, Jun. 2003) (HP030980-HP030987); http://archives.sensormag.com/articles/0603/14/main.shtml; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; (8 pages).

Information Sciences Institute, University of Southern California, Transmission Control Protocol, RFC: 793, Sep. 1981. (HP030989-HP031077); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; (88 pages).

Second Rebuttal Expert Report of Dr. Chris Gregory Bartone, P.E. Regarding Issues Pertaining to the Defense of Inequitable Conduct; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Apr. 12, 2010 (31 pages).

Rebuttal Expert Report of Mark E. Nusbaum; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Apr. 12, 2010 (46 pages).

Expert Report of Alvin T. Rockhill, Esq.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Mar. 11, 2010 (34 pages).
Supplemental Expert Report of James E. McIntyre; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Mar. 11, 2010 (38 pages).
Excerpts of Deposition of Kevin Adkins; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Feb. 4, 2010 (5 pages).
Second Amended Answer and Counterclaims; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Oct. 21, 2009 (43 pages).
Rebuttal Expert Report of Dr. Chris Gregory Bartone, P.E.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Oct. 2, 2009 (46 pages).
Expert Report of James E. McIntyre; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 25, 2009 (37 pages).
Expert Report of Dr. Chris Gregory Bartone, P.E.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 25, 2009 (45 pages).
Proposed Second Amended Answer and Counterclaims; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 29, 2009 (43 pages).
Declaration of Kevin Adkins Under 37 C.F.R. 1.132 in U.S. Appl. No. 11/336,362; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Apr. 20, 2009 (7 pages).
Declaration of James Portaro Under 37 C.F.R. 1.132 in U.S. Appl. No. 11/336,362; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Oct. 13, 2008 (4 pages).
Second Declaration of James Portaro Under 37 C.F.R. 1.132 in U.S. Appl. No. 11/336,362; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Oct. 4, 2009 (6 pages).
nRF24E1 Evaluation Board nRF24E-1EVBOARD; Nordic VLSI ASA (White Paper); Jun. 2003 (17 pages).
nRF24xx Link Integrity; Nordic VLSI ASA (White Paper); Apr. 2003 (23 pages).
Single Chip 2.4 GHz Wireless Mouse Using nRF24Ex; Nordic VLSI ASA (White Paper); May 2003 (9 pages).
Debugging nRF24Ex/nRF9Ex Programs Using the Keil u Vision2 Debugger; Nordic VLSI ASA (White Paper); Feb. 2004 (5 pages).
Frequency Agility Protocol for nRF24XX; Nordic VLSI ASA (White Paper); Oct. 2004 (22 pages).
Simple Frequency Hopping with the nRF9E5 and nRF24E1; Nordic VLSI ASA (White Paper); Feb. 2003 (9 pages).
Introduction to Wireless Networks; Nordic Semiconductor ASA (White Paper); Sep. 2004 (16 pages).
Universal Low Cost USB DuoCeiver nAN24-04 Using nRF2401; Nordic VLSI ASA (White Paper); May 2003 (22 pages).
nRF24E1 Wireless Hands-Free DEMO nAN24-05; Nordic VLSI ASA (White Paper); Nov. 2003 (16 pages).
nRF24XX Mouse Keyboard Demo nAN24-06; Nordic VLSI ASA (White Paper); Oct. 2003 (18 pages).
nRF Radio Protocol Guidelines nAN400-07; Nordic VLSI ASA (White Paper); Dec. 2002 (15 pages).
nRF240x ShockBurst Technology; Nordic VLSI ASA (White Paper); Feb. 2003 (8 pages).
nRF24E1-Evaluation Kit nRF24E1-EVKIT; Nordic VLSI ASA (White Paper); Jun. 2003 (1 page).
Press Release; Nordic VLSI ASA; Apr. 30, 2003 (2 pages).

Product Change Notification (PCN) Nordic Semiconductor ASA; Jan. 22, 2004 (1 page).
Product Change Notification (PCN) Nordic Semiconductor ASA; Mar. 31, 2004 (4 pages).
Product Change Notification (PCN) Nordic Semiconductor ASA; Mar. 31, 2004 (1 page).
Design-in of RF Circuits; Nordic VLSI ASA (White Paper); Jun. 2003 (5 pages).
Wireless Hands-Free Using nRF24E1; Nordic VLSI ASA (White Paper); Oct. 2003 (13 pages).
nRF24Ex in a Wireless Keyboard Design; Nordic VLSI ASA (White Paper); Oct. 2003 (8 pages).
RF Communication in a Multi-User Environment; Nordic VLSI ASA (White Paper); May 2003 (7 pages).
802.15.4 IEEE Standards for Information Technology—Telecommunications Information Exchange Between Systems—Local and Metropolitan Area Networks—Specific Requirements; Part 15.4 Wireless Medium Access Control (MAC) and Physical Layer (PHY) Specifications for Low-Rate Wireless Personal Area Networks (LR-WPANs); The Institute of Electrical and Electronics Engineers, Inc.; Oct. 1, 2003 (12 pages).
Product Specification for 2.4GHz RF Transceiver with Embedded 8051 Compatible Micro-Controller and 9 Input, 10 Bit ADC nRF24E1; Nordic Semiconductor ASA; Jun. 2004 (119 pages).
/4 Printed Momopole Antenna 2 for 2.45GHz; Nordic Semiconductor ASA (White Paper); Jan. 2005 (6 pages).
Nordic Press Release, "Nordic VLSi introduces nRF24E1 and nRF24E2" from http://www.nordicsemi.com/index.cfm?obj=document&act=display&doc=139; Apr. 20, 2003 (2 pages).
"Packett Switching with Satellites", Abramson, Norman; AFIPS Conference Proceedings, vol. 42; 1973 National Computer Conference and Expositions; Montvale, NJ 07645; Jun. 1973 (cover pages and pp. 696-702).
"The Aloha System", Abramson, Norman; Computer-Communication Networks; University of Hawaii; Honolulu, Hawaii; 1973 (cover pages and pp. 501-517). (The year of publication is sufficiently earlier than the effective U.S. filing date and any priority date so that the particular month of publication is not in issue. See MPEP 609.04(a)).
"I-Vote: An Audience Voting System", Jones, M. Cameron, et al.; University of Illinois at Urbana-Champaign; Champaign, IL; Apr. 2004 (6 pages).
Responsive Innovations, LLC's Responses and Objections to Holtzbrinck Publishers, LLC's First Set of Requests for admission (Nos. 1-269); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 1, 2009 (77 pages).
Answers and Objections to MacMillan's Second Set of Interrogatories to Responsive Innovations, LLC (Nos. 9-12); *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 1, 2009 (10 pages).
MacMillan Publishers, Inc.'s First Supplemental Response to Plaintiffs First Set of Interrogatories to MacMillan MacMillan Publishers, Inc.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; May 5, 2009 (58 pages).
Holtzbrinke Publishers, LLC's First Supplemental Response to Plaintiffs First Set of Interrogatories to Holtzbrinck Publishers, LLC; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; May 5, 2009 (8 pages).
Holtzbrinck Publishers, LLC's First Set of Requests for Admissions to Responsive Innovations, LLC; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Apr. 14, 2009 (38 pages).
Memorandum Opinion and Order; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Mar. 31, 2009 (26 pages).

Holtzbrink Publishers, LLC's Response to Plantiff Turning Technologies, LLC's First Set of Request for Admissions: *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Mar. 9, 2009 (4 pages).

Reply Claim Construction Brief by Defendants Holtzbrinck Publishers, LLC and Macmillan Publishers, Inc.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jan. 15, 2009 (25 pages).

Plaintiff's Responding Claim Construction Brief; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jan. 15, 2009 (22 pages).

Plaintiff's Opening Claim Construction Brief; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Dec. 15, 2008 (31 pages).

Opening Claim Construction Brief by Defendants Holtzbrinck Publishers, LLC and Macmillan Publishers, Inc. *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Dec. 15, 2008 (37 pages).

First Amended Answer and Counterclaims; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Nov. 26, 2008 (18 pages).

Macmillan Publishers, Inc.'s Response to Plaintiffs First Set of Interrogatories to Macmillan Publishers, Inc.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 25, 2008 (18 pages).

Holtzbrinck Publishers, LLC's response to Plaintiffs First Set of Interrogatories to Holtzbrinck Publishers, LLC; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 25, 2008 (10 pages).

RadioShack.com—Home & Office; Home security & safety; Remotes: 2-Way Find One, . . . Tech Specs, pp. 1-2, Dec. 20, 2005 (http://radioshack.com/products/index.jsp).

Supplementary European Search Report; EP Application No. 06719152.8; Feb. 27, 2009 (15 pages).

Beamish, Darin; U.S. Provisional Application entitled "Audience Response Systems, Methods and Apparatus"; U.S. Appl. No. 60/607,147, filed Sep. 3, 2004.

Beamish, Darin; U.S. Provisional Application entitled "Audience Response Systems, Methods and Apparatus"; U.S. Appl. No. 60/661,052, filed Mar. 9, 2005.

Second Supplemental Expert Report of James E. McIntyre; *Responsive Innovations, LLC* and *Turning Technologies, LLC* v. *Holtzbrinck Publishers, LLC* and *MacMillan Publishers, Inc.* ND Ohio ED, 4:08-cv-01184-CAB; Mar. 16, 2011 (8 pages).

Holtzbrinck Publishers, LLC's Third Supplemental Response to Plaintiff's First Set of Interrogatories to Holtzbrinck Publishers, LLC; *Responsive Innovations, LLC* and *Turning Technologies, LLC* v. *Holtzbrinck Publishers, LLC* and *MacMillan Publishers, Inc.* ND Ohio ED, 4:08-cv-01184-CAB; Mar. 17, 2011 (14 pages).

MacMillan Publishers, Inc.'s Third Supplemental Response to Plaintiffs First Set of Interrogatories to MacMillan Publishers, Inc.; *Responsive Innovations, LLC* and *Turning Technologies, LLC* v. *Holtzbrinck Publishers, LLC* and *MacMillan Publishers, Inc.* ND Ohio ED, 4:08-cv-01184-CAB; Mar. 17, 2011 (14 pages).

Office Action in corresponding JP Application No. 2007-552314 (Summary Translation); Jun. 9, 2011. (2 pages).

Statement of Related Litigation, Sep. 30, 2010.

Plaintiffs' Motion for Summary Judgment—Redacted; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 25, 2010 (35 pages).

Supplemental Expert Report of Dr. Chris Gregory Bartone, P.E.; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 21, 2010 (5 pages).

Plaintiffs' Opposition to Defendants' Motion for Summary Judgment—Redacted; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 4, 2010 (31 pages).

Declaration of Chris Gregory Bartone, Ph.D in Support of Plaintiffs' Opposition to Defendants' Motion for Summary Judgement; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 25, 2010 (2 pages).

Declaration of Michael Broderick in Support of Plaintiffs' Opposition to Defendants' Motion for Summary Judgement; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 25, 2010 (2 pages).

Plaintiffs' Reply in Support of its Motion for Summary Judgment—Redacted; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 4, 2010 (7 pages).

Declaration of Dr. Chris Gregory Bartone, P.E. in Support of Plaintiffs' Reply in Support of its Motion for Summary Judgement; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 4, 2010 (3 pages).

Defendants' Motion for Summary Judgement—Redacted; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 24, 2010 (36 pages).

Declaration of James E. McIntyre in Support of Defendants' Motion for Summary Judgement of Patent Invalidity; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 24, 2010 (13 pages).

Declaration of Mats A. Selen in Support of Defendants' Motion for Summary Judgement of Patent Invalidity; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Jun. 24, 2010 (3 pages).

Claim Chart for ALOHA System; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; 2010 (24 pages).

Defendants' Memorandum in Opposition to Plaintiffs' Motion for Summary Judgement—Redacted; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 4, 2010 (31 pages).

Declaration of Mats A. Selen in Support of Defendants' Opposition to Plaintiffs' Motion for Summary Judgement; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 1, 2010 (31 pages).

Declaration of James E. McIntyre in Support of Defendants' Opposition to Plaintiffs' Motion for Summary Judgement; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 3, 2010 (4 pages).

Anticipation/Obviousness Chart; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Aug. 4, 2010 (1 page).

ZigBee Technology: Wireless Control that Simply Works; *Responsive Innovations, LLC* and *Turning Technologies, LLC* v. *Holtzbrinck Publishers, LLC* and *MacMillan Publishers, Inc.* ND Ohio ED, 4:08-cv-01184-PCE; Sep. 10, 2004 (35 pages).

ZigBee/IEEE 802.15.4 Summary; *Responsive Innovations, LLC and Turning Technologies, LLC v. Holtzbrinck Publishers, LLC and MacMillan Publishers, Inc.* ND Ohio ED, 4:08-cv-01184-PCE; Oct. 3, 2003 (20 pages).

Medina Documents; *Responsive Innovations, LLC and Turning Technologies, LLC v. Holtzbrinck Publishers, LLC and MacMillan Publishers, Inc.* ND Ohio ED, 4:08-cv-01184-PCE; Jan. 12, 2004 (3 pages).

Defendants' Reply in Support of Motion for Summary Judgment; *Responsive Innovations, LLC and Turning Technologies, LLC v. Holtzbrinck Publishers, LLC and MacMillan Publishers, Inc.* ND Ohio ED, 4:08-cv-01184-PCE; Aug. 4, 2010 (26 pages).

Transcript of Proceedings had Before the Honorable Judge Christopher A. Boyko, Judge of Said Court, on Thursday, Jul. 7, 2011, Commencing at 2:00 O'Clock P.M.; *Responsive Innovations, LLC and Turning Technologies, LLC v. Holtzbrinck Publishers, LLC* et al. ND Ohio ED, 4:08-cv-01184-CAB; Jul. 7, 2011 (76 pages).

\* cited by examiner

TRANSMITTER CONTROLLED COMMUNICATION LINKS

PRIORITY

Cross Reference to Related Applications

This application is a continuation of U.S. application Ser. No. 11/336,362 filed on Jan. 20, 2006, which claims priority to U.S. Provisional Application No. 60/645,021 filed on Jan. 21, 2005. The disclosures of both applications are incorporated by reference herein in their entirety.

FIELD OF INVENTION

The present application relates to a wireless response system and method. More particularly, the present application relates to a wireless response system having a plurality of transmitters and at least one receiver and a method for using the same.

BACKGROUND

Audience response systems are employed to retrieve (or receive) responses from a group of individuals at a central location. Such systems may be used in classroom settings, corporate meetings, or in other gatherings of individuals. Wireless audience response systems may include at least one base unit and a plurality of handheld units. Each handheld unit typically includes a keypad for inputting user responses.

In one known embodiment, the base unit controls communication by, for example, polling each handheld unit. If a user has entered a response into the keypad, the response is transmitted to the base unit when the handheld unit is polled. After receipt of the response, the base unit may send an acknowledgment signal.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes in the figures represent one example of the boundaries. One of ordinary skill in the art will appreciate that one element may be designed as multiple elements or that multiple elements may be designed as one element. An element shown as an internal component of another element may be implemented as an external component and vice versa. The drawings may not be to scale and the proportion of certain elements may be exaggerated for the purpose of illustration.

DETAILED DESCRIPTION

This application describes a wireless response system and method of use. The system may include at least one handheld device and a base unit. The system may employ a single handheld device or several thousand handheld devices. The handheld device may be capable of transmitting and receiving information. The handheld device may also be referred to as a transmitter device or a handheld user transceiver.

Similarly, although the base unit is referred to as a "receiver," it may be capable of both transmitting and receiving information. The base unit may be referred to as a receiver or a central transceiver.

"Address", as used herein, includes but is not limited to one or more network accessible addresses, device identifiers, electronic identification numbers (such as EINs), IP addresses, url and ftp locations, e-mail addresses, names, a distribution list including one or more addresses, network drive locations, account numbers or other types of addresses that can identify a desired destination or device.

"Computer-readable medium", as used herein, refers to any medium that participates directly or indirectly in providing signals, instructions and/or data to one or more processors for execution. Such a medium may take many forms, including but not limited to, non-volatile media, volatile media, and transmission media. Non-volatile media may include, for example, optical disks, magnetic disks or so-called "memory sticks." Volatile media may include dynamic memory. Transmission media may include coaxial cables, copper wire, and fiber optic cables. Transmission media can also take the form of acoustic or light waves, such as those generated during radio-wave and infra-red data communications, or take the form of one or more groups of signals. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, a processor or other electronic device can read.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical or optical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Figure 1:
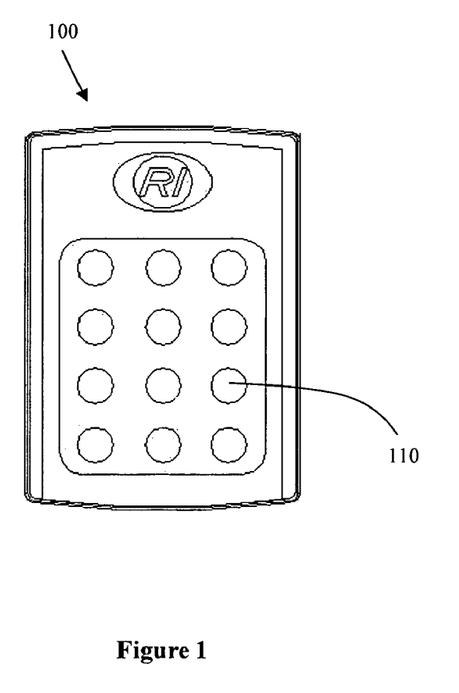
FIG. 1 is a simplified front plan view of one embodiment of a handheld device for a wireless response system.

FIG. 1 illustrates a front plan view of one embodiment of a handheld device 100 for a wireless response system. In the illustrated embodiment, the handheld device 100 may include a plurality of buttons 110 configured to accept a user input. In alternative embodiments, the handheld device may employ switches, dials, an LCD touch screen, a graphical user interface, or any other known interface configured to accept a user input.

In one embodiment, the handheld device 100 has a length of less than 5 inches, a width of less than 4 inches, and a height of less than 0.75 inches. In an alternative embodiment, the handheld device has a length of 3.3 inches, a width of 2.1 inches, and height of 0.3 inches. In other alternative embodiments, the handheld device may be larger or smaller.

In one embodiment, the handheld device 100 is battery operated. The battery may be a removable battery, such as a AA or AAA size battery or a watch battery. In one embodiment, the handheld device 100 receives operative power from two (2) 3.0V batteries (not shown). Exemplary batteries include, without limitation, CR2032 coin cell lithium batteries, CR2320 coin cell lithium batteries, or CR 1025 coin cell lithium batteries. In one embodiment, the batteries have a diameter of less than 1.25 inches and a height of less than 0.25 inches. In another embodiment, the batteries have a diameter of approximately 0.8 inches and a height of approximately 0.125 inches. When such batteries are used with one of the above described embodiments of the handheld device 100, the handheld device 100 has a length that is less than 5 times the diameter of one battery, a width that is less than 3 times the diameter of one battery, and a height that is less than 3 times the height of one battery. In one embodiment, two batteries may be stacked, one on top of the other. In another embodiment, the batteries may be placed side by side.

Figure 2:
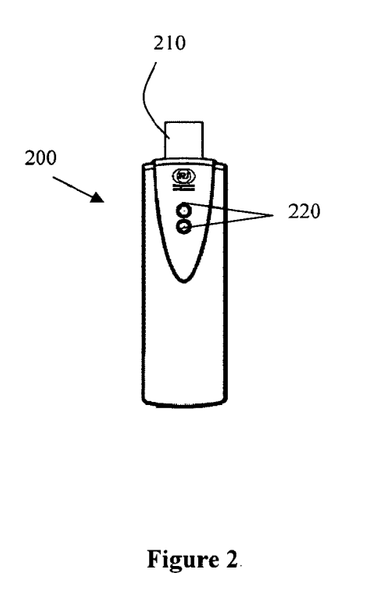
FIG. 2 is a simplified front plan view of one embodiment of a receiver for a wireless response system.

FIG. 2 illustrates a front plan view of one embodiment of a receiver 200 for a wireless response system. In the illustrated embodiment, the receiver 200 may include a connector 210 configured to be connected to a USB port of a computer. In alternative embodiments, the receiver may include a connector configured to be connected to a firewire or iLink port, a serial port, or any other known type of computer port. In another alternative embodiment, the receiver may wirelessly communicate with a computer via an infrared or RF transmitter. In yet another alternative embodiment, the receiver does not directly connect to a computer.

With continued reference to FIG. 2, the receiver 200 may include at least one LED 220. The LED 220 may be configured to indicate on/off status and transmission status. In alternative embodiments, the receiver may employ a dial, an LCD screen, or other known indicators. In another alternative embodiment, the receiver does not include any indicators.

In one embodiment, the receiver 200 has a length of less than 6 inches, a width of less than 2.5 inches, and a height of less than 1 inch. In an alternative embodiment, the receiver 200 has a length of 3.7 inches, a width of 1.1 inches, and a height of 0.4 inches. In other alternative embodiments, the receiver may be larger or smaller.

Figure 3:
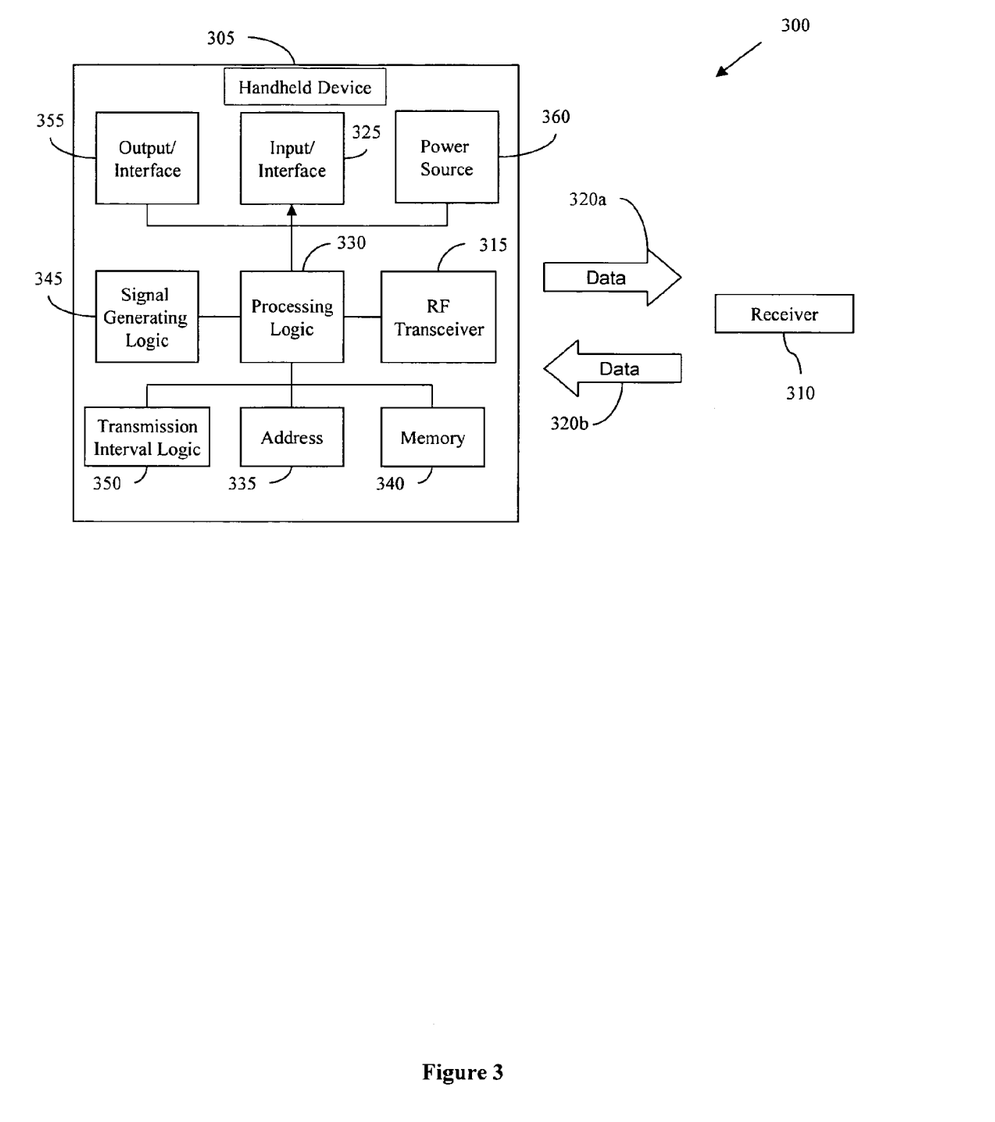
FIG. 3 is a simplified schematic drawing of one embodiment of a wireless response system including a handheld device in communication with a receiver.

FIG. 3 illustrates one embodiment of a wireless response system 300. In the illustrated embodiment, the system 300 includes at least one handheld device 305 and at least one receiver 310. The handheld device 305 includes a wireless data transmitter illustrated as a radio frequency (RF) transceiver 315 configured to transmit RF signals as shown at 320a and receive RF signals as shown at 320b. In one embodiment, the RF transceiver 315 may be configured as model RRRF-01, commercially available from Responsive Innovations, LLC. In an alternative embodiment (not shown), the handheld device may include an RF transmitter, but not a receiver or a transceiver. In another alternative embodiment (not shown), the handheld device may include an infrared (IR) source configured to transmit data and/or an IR sensor configured to receive data.

In one embodiment, the transceiver 315 transmits RF signals and receives RF signals on the same frequency or channel, or on the same band of frequencies or channels. In another embodiment, the transceiver 315 transmits RF signals at a first frequency (or first band of frequencies) and receives RF signals at a second frequency (or second band of frequencies).

As shown in FIG. 3, the handheld device 305 includes an input interface 325. Exemplary input interfaces include a keypad, an LCD touchpad, dials, toggle switches, levers, knobs, buttons, or any other appropriate control or input mechanisms.

In one embodiment, the transceiver 315 may transmit and receive RF transmissions on one of a plurality of different frequencies. The user may select the frequency through the input interface 325. In this manner, the user may select a frequency that has little or no local RF activity to avoid interference. In one embodiment, the user may select a frequency from 82 different frequencies. In an alternative embodiment, the user may select from more or fewer frequencies.

The input interface 325 is in communication with processing logic 330. When a user inputs a selection into the input interface 325, the user selection may be communicated to the processing logic 330. The processing logic 330 may then generate and format a signal for transmission. In one embodiment, the signal may include a stored address 335, and the user selection. The address 335 may be a number, a sequence of alphanumeric characters, a sequence of ASCII characters, and the like. In one embodiment, the address 335 is permanently assigned to a handheld device 305 and stored in a computer-readable medium, such as a memory 340.

In an alternative embodiment (not shown), an address may be generated upon the occurrence of a predetermined event. For example, the processing logic 330 or other logic may randomly generate an address 335 each time a user inputs a selection or after a predetermined number of selections. In another embodiment, the receiver 310 may assign an address to each handheld device 305, or the user may enter an identifier.

With continued reference to FIG. 3, the processing logic 330 is shown to be in communication with signal generating logic 345. After the processing logic retrieves the address 335, the processing logic 330 sends the user selection and the address 335 to the signal generating logic 345. The signal generating logic 345 may generate an RF signal that encodes the user selection and the address. In an alternative embodiment (not shown), the processing logic 330 may perform the step of generating an RF signal.

The processing logic 330 may also be in communication with the RF transceiver 315. After the RF signal is generated, the processing logic 330 instructs the RF transceiver 315 to transmit the RF signal as shown at 320a. The RF signal may also be referred to as a wireless selection signal. In one embodiment, the RF signal is transmitted until an acknowledgment signal is received or for a predetermined amount of time.

As illustrated in FIG. 3, the processing logic 330 may be in communication with a transmission interval logic 350. The transmission interval logic 350 generates a transmission interval. The transmission interval is an amount of time or clock cycles that elapse between transmission attempts of the RF signal. In one embodiment, the transmission interval is generated on the order of microseconds. In alternative embodiments, the transmission interval is generated on the order of seconds, milliseconds, nanoseconds, picoseconds, femtoseconds, attoseconds, or any other known measurement of time. The transmission interval can be optimized by a number of factors, such as: the number of handheld devices, the number of receivers, the number of users, the frequency of which questions are asked by a moderator, the frequency of the RF signal, the amount of data being transmitted, and the type of data being transmitted.

In one embodiment, the transmission interval logic 350 generates a transmission interval by generating a random number. In another embodiment, the transmission interval is calculated according to a mathematical function. For example, the transmission interval may be calculated by multiplying the address 335 by programmed constant or by a random number. In another embodiment (not shown), the transmission interval may be generated by the processing logic 330. In yet another alternative embodiment (not shown), a unique transmission interval may be a fixed, predetermined number and stored in memory 340.

In another alternative embodiment, the time interval may vary with each retransmission of a selection. For example, the time interval may become progressively longer after each retransmission. In one embodiment, the transmission interval may be calculated according to the formula $t_n = r + n(\epsilon)$, where $t_n$ is the time interval for the $n^{th}$ iteration, r is a random number that is either predetermined or generated with each user selection, n is the number of current iterations, and $\epsilon$ is a small number relative to r. In this embodiment, for example, the transmission interval after the first transmission may be 5 ms, the transmission interval after the first re-transmission may be 5 ms+100 µs, the transmission interval after the second re-transmission may be 5 ms+200 µs, etc.

The handheld device 305 transmits the RF signal at a user selected frequency or at a default frequency, according to the transmission interval. In other words, the RF transceiver 315 transmits the RF signal, then pauses for a length of time equal to the transmission interval, then repeats the transmission. This process may be repeated for a predetermined number of transmissions, a predetermined length of time, or until an acknowledgment signal is received. In one embodiment, the process repeats until the first occurrence of: (a) the receipt of an acknowledgment signal or (b) eight (8) seconds elapse after the first RF transmission. In an alternative embodiment, the predetermined length of time may be five (5) seconds. In another alternative embodiment, there is no predetermined length of time for terminating the transmission. In yet another alternative embodiment, the predetermined length of time may be programmable by a user.

The transmission interval may serve several functions. For example, using a transmission interval may conserve power, because sending a transmission intermittently may use less power than sending a continuous transmission. Further, when a single receiver 310 is receiving RF signals from a plurality of handheld devices 305, the use of different transmission intervals staggers the RF signals, such that they will arrive at the receiver 310 at different times. Additionally, some known transceivers may not be capable of simultaneous or near simultaneous receiving and transmitting of an RF signal. If such a transceiver is employed, the transmission interval allows the RF transceiver 315 to receive an acknowledgement signal at a time when it is not transmitting an RF signal.

With continued reference to FIG. 3, the handheld device also includes an output interface 355. In one embodiment, the output interface 355 indicates operating status to a user such as: that a signal is being transmitted, that an acknowledgment has been received, that user entry has been confirmed, and the like. In such an embodiment, one or more LEDs, an LCD, or other display may serve as an output interface 355.

In one exemplary embodiment (not shown), the handheld device 305 employs a three color LED arrangement selected for the low power requirements of LED technology. In this embodiment, the LED flashes a first color (such as amber) to indicate that the handheld device 305 is transmitting an RF signal. The LED emits a solid (i.e., non-flashing) second color (such as green) to indicate that an acknowledgement signal has been received and the data has been accepted by the receiver 310. The LED emits a solid third color (such as red) to indicate that no acknowledgement signal has been received and the transmission has been terminated unsuccessfully. In an alternative embodiment, the handheld device 305 may employ a fourth LED display to indicate that an acknowledgment signal is received, but the user selection was not accepted by the receiver 310.

In another embodiment, the output interface 355 may include an LCD. A first display message indicates that the handheld device 305 is transmitting a signal, a second display message indicates that an acknowledgment has been received, and a third display message indicates that no acknowledgment has been received and the transmission has been terminated. Additionally, the LCD screen may display the user selection along with the transmission status.

In one embodiment, the handheld device 305 includes a power source 360, such as a battery. The power source 360 may be a removable battery, such as a AA or AAA size battery or a watch battery, which can be replaced when the power runs low. In one embodiment, the power source 360 includes two (2) 3.0V batteries. Exemplary batteries include, without limitation, CR2032 coin cell lithium batteries, CR2320 coin cell lithium batteries, or CR 1025 coin cell lithium batteries.

In one embodiment, the handheld device 305 can transmit an RF signal when supplied with a current of 10.5 mA and can receive an RF signal when supplied with a current of 19 mA. In other embodiments, the handheld device can transmit an RF signal when supplied with a current of less than 15 mA and can receive an RF signal when supplied with a current of less than 25 mA.

Alternatively, the power source 360 may be more permanently fixed within the handheld device 305 and the handheld device 305 may be plugged into an external power source to recharge the power source 360. In another embodiment (not shown), the handheld device may alternatively be configured to be plugged into an external power source or employ photovoltaic panels.

Figure 4:
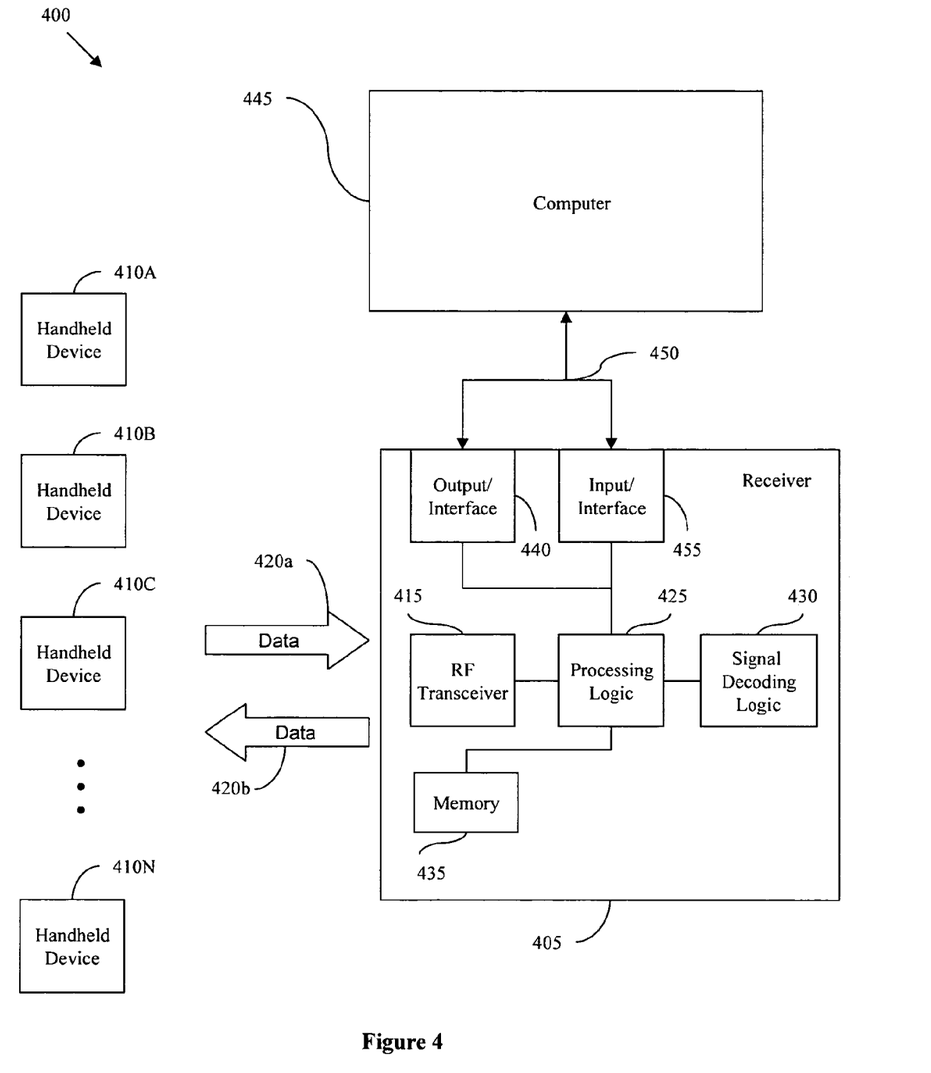
FIG. 4 is a simplified schematic drawing of one embodiment of a wireless response system including a receiver in communication with a plurality of handheld device.

FIG. 4 illustrates a simplified schematic drawing of one embodiment of a wireless response system 400, having a receiver 405 in communication with a plurality of handheld devices 410A-N. The handheld devices 410A-N may be substantially similar to the handheld device 305 illustrated in FIG. 3. It should be understood that the receiver 405 may be in data communication with a single handheld device or many handheld devices.

As shown in FIG. 4, the receiver 405 includes an RF transceiver 415 configured to receive an RF signal as shown at 420a and send an RF signal as shown at 420b. In an alternative embodiment (not shown), the receiver may include an RF receiver, but not a transmitter or a transceiver. In another alternative embodiment (not shown), the receiver may include an infrared (IR) sensor configured to receive data and/or an IR source configured to transmit data.

The receiver 405 further includes processing logic 425 in data communication with signal decoding logic 430. In this embodiment, when a signal is received by the RF transceiver, it is communicated to the processing logic 425. The processing logic may instruct the signal decoding logic 430 to decode and parse the signal. The signal decoding logic 430 decodes the signal and parses the signal into components including a user selection and an address. In an alternative embodiment (not shown), the processing logic 425 may decode and parse the signal.

In one embodiment (not shown), the receiver may have an ID. The processing logic may be configured to only accept signals that contain the receiver ID, thus ensuring that any collected data is not skewed by spurious signals. In one embodiment, a replacement receiver may have the same ID as a first receiver. In such an embodiment, the replacement receiver would accept signals from the handheld devices, without the need for reprogramming the handheld devices. In another embodiment, all manufactured receivers may have the same ID.

After the signal has been successfully decoded and parsed, the processing logic 425 may generate an acknowledgment signal that contains, for example, the address and an acknowledgment indicator. The acknowledgment signal may also include an indication of whether the user selection was accepted. The processing logic 425 may also instruct the RF transceiver 415 to communicate the acknowledgment signal over communication link 420b.

With continued reference to FIG. 4, the receiver 405 also includes a computer-readable medium such as a memory 435, configured, for example, as RAM, EEPROM, or other types of writable memory. In one embodiment, the user selection and/or the address are stored in the memory 435 after the signal has been decoded and parsed by the signal decoding logic 430. The storing of the user selection and/or the address may occur before, after, or concurrently with the transmission of the acknowledgment signal. In an alternative embodiment (not shown), the receiver does not have a writable memory and the user selection and unique identifier are instead only communicated to an external computer.

As further shown in FIG. 4, the receiver 405 includes an output interface 440. In the illustrated embodiment the output interface 440 is an interface for a computer 445. The computer 445 may be a PC, a laptop, a graphing calculator, or any other type of computer. The output interface 440 is in communication with the computer 445 via a hardwire connection 450. The hardwire connection 450 may connect to a USB port, a serial port, a firewire or iLink port, or any other type of port. In an alternative embodiment (not shown), the output interface 440 is in communication with the computer 445 via a wireless connection.

In the illustrated embodiment, the receiver 405 further includes an input interface 455. In an alternative embodiment (not shown), the receiver includes a single interface for both input and output. The receiver 405 may receive instructions from the computer 445 through the input interface 455, such as instructions to wipe the memory 435. In one embodiment, the input interface 455 receives power from the computer 445 through the connection 450. In an alternative embodiment (not shown), the receiver 405 may include an internal power source, such as a battery or external power means.

In an alternative embodiment (not shown), the receiver is not connected to an external computer. Instead, the output interface 440 is a display, such as an LCD display. In such an embodiment, the user selection and/or the address may be displayed on the output interface 440. In another alternative embodiment (not shown), the handheld device is not in communication with a computer during the communication of RF signals. Instead, data may be stored in the memory 435 and transferred to a computer 445 at a later time.

Figure 5:
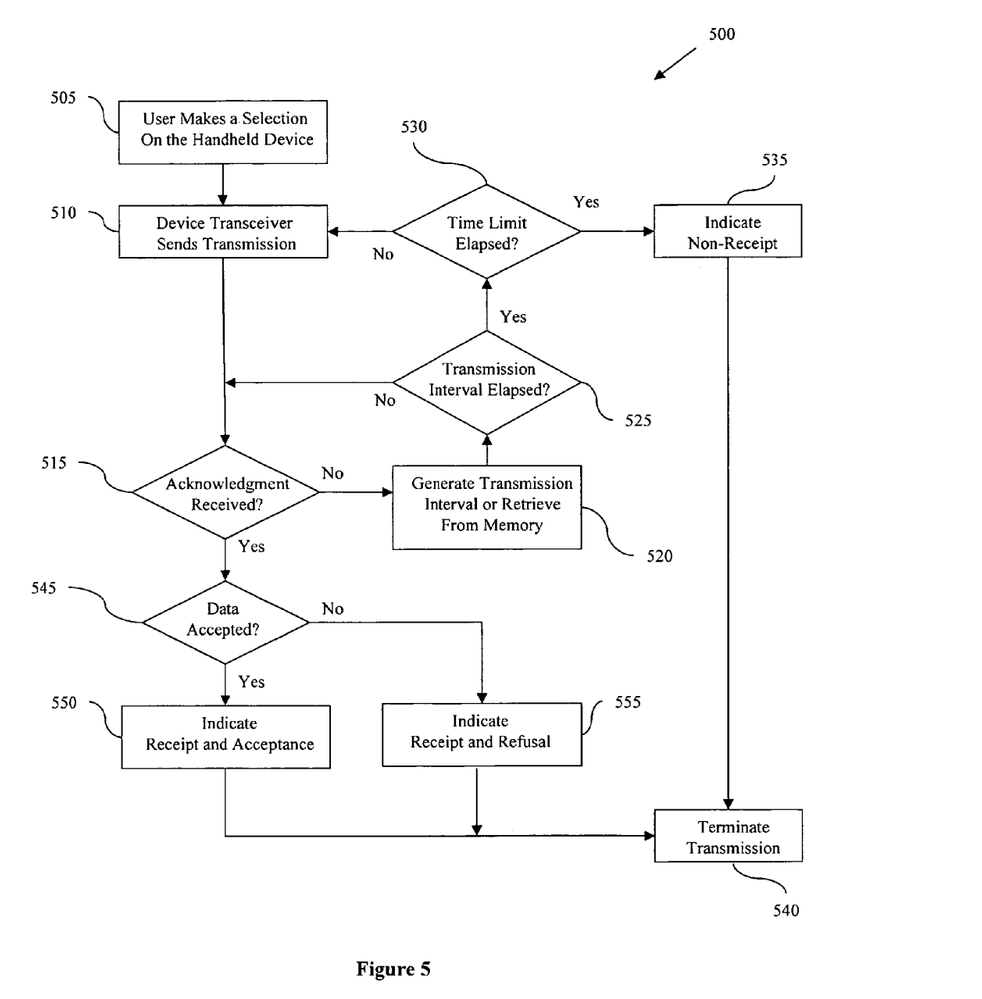
FIG. 5 is a simplified flow chart of one embodiment of a method for using a handheld device in a wireless response system.

FIG. 5 illustrates a flow chart diagram for an exemplary method 500 for using a handheld device in a wireless communication system. The user makes a selection, step 505, by selecting a button, turning a dial, etc. on the handheld device. After the user has made a selection, the handheld device communicates a signal that includes the user selection and an address, step 510.

The handheld device then waits for an acknowledgment signal, step 515. If an acknowledgment signal is not received, the handheld device generates or retrieves from memory a transmission interval, step 520, for example, as described above in reference to FIG. 3. The handheld device then determines whether the transmission interval has elapsed, step 525. If the transmission interval has not elapsed, the handheld device continues to wait for an acknowledgment signal, step 515. If the transmission interval has elapsed, then the handheld device determines whether a predetermined transmission time limit has elapsed, step 530. If the predetermined transmission time limit has elapsed, the handheld device indicates that no acknowledgment was received, step 535, and the handheld device terminates transmission, step 540. If the predetermined transmission time limit has not elapsed, the handheld device re-transmits the signal, step 510. The handheld device then waits again for an acknowledgment signal, step 515.

Once the handheld device receives an acknowledgment signal, step 515, it determines whether the acknowledgment signal indicates that the data was accepted, step 545. If the data was accepted, the handheld device indicates receipt and acceptance, step 550, and terminates transmission, step 540. If the data was not accepted, the handheld device indicates receipt and non-acceptance, step 555, and terminates transmission.

In one embodiment, the handheld device transmits an RF signal and receives an acknowledgment RF signal at the same frequency, or on the same frequency band. In another embodiment (not shown), the handheld device transmits an RF signal at a first frequency (or first frequency band) and receives an acknowledgment RF signal at a second frequency (or second frequency band) different from the first frequency (or first frequency band). In such an embodiment, the handheld device may transmit and receive signals concurrently.

Figure 6:
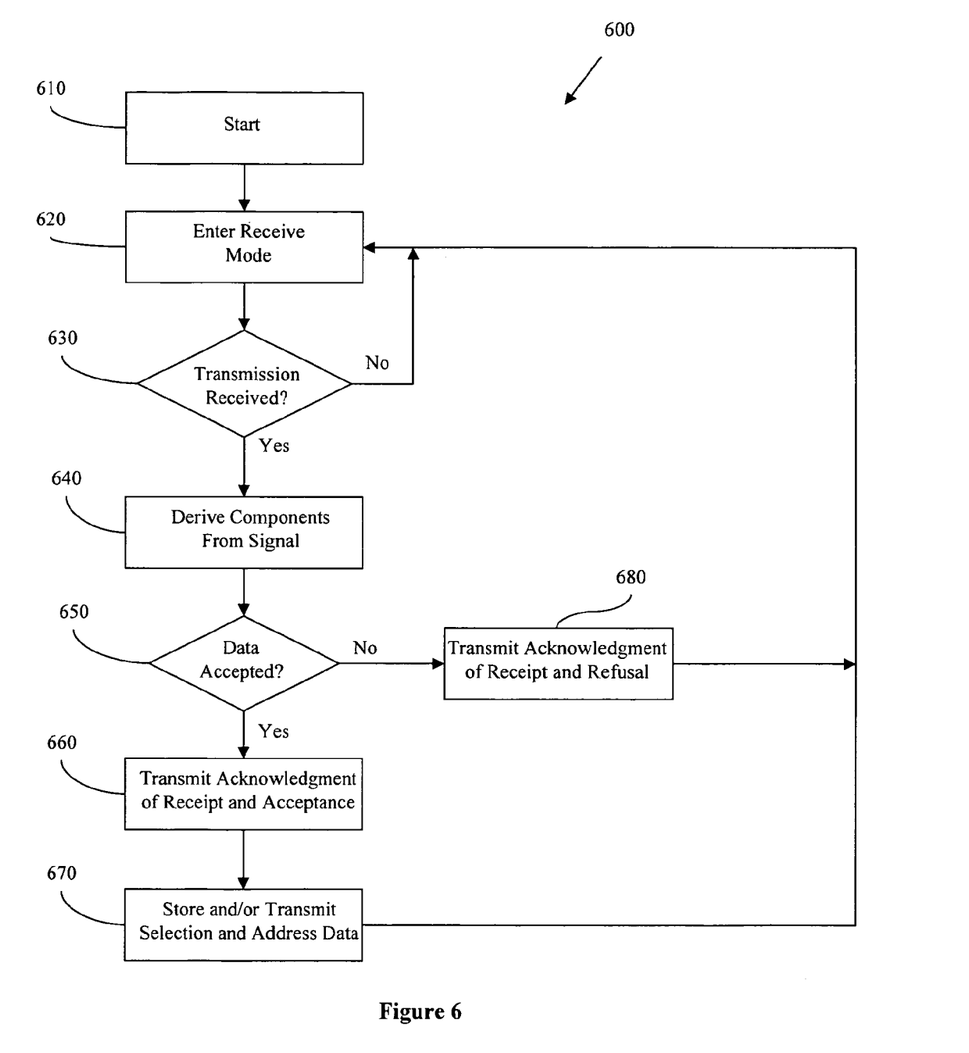
FIG. 6 is a simplified flow chart of one embodiment of a method for using a receiver in a wireless response system.

FIG. 6 illustrates a flow chart diagram for an exemplary method 600 for using a receiver in a wireless communication system. The receiver is first powered on, step 610, and enters a receive mode, step 620. In one embodiment, the receiver is powered on merely by plugging it into a USB port of a computer. While the receiver is in receive mode, it waits to receive a signal on a communication link, step 630. If no signal is received, the receiver remains in receive mode, step 620. Once a signal is received, the receiver may derive components from the signal such as user selected data or address data, step 640.

After the data has been derived, the receiver determines whether some or all of the data can be accepted, step 650. If the data is accepted, the receiver transmits an acknowledgment of receipt and acceptance, step 660, and the data is stored in the receiver's memory and/or transmitted to an external processor, step 670. The receiver then returns to receive mode, step 620. In another embodiment (not shown), step 670 may be performed before or concurrently with step 660. If the data is determined to be unacceptable, step 650, the receiver may transmit an acknowledgment of receipt and non-acceptance of data, step 680. The receiver then returns to receive mode, step 620.

Figure 7:
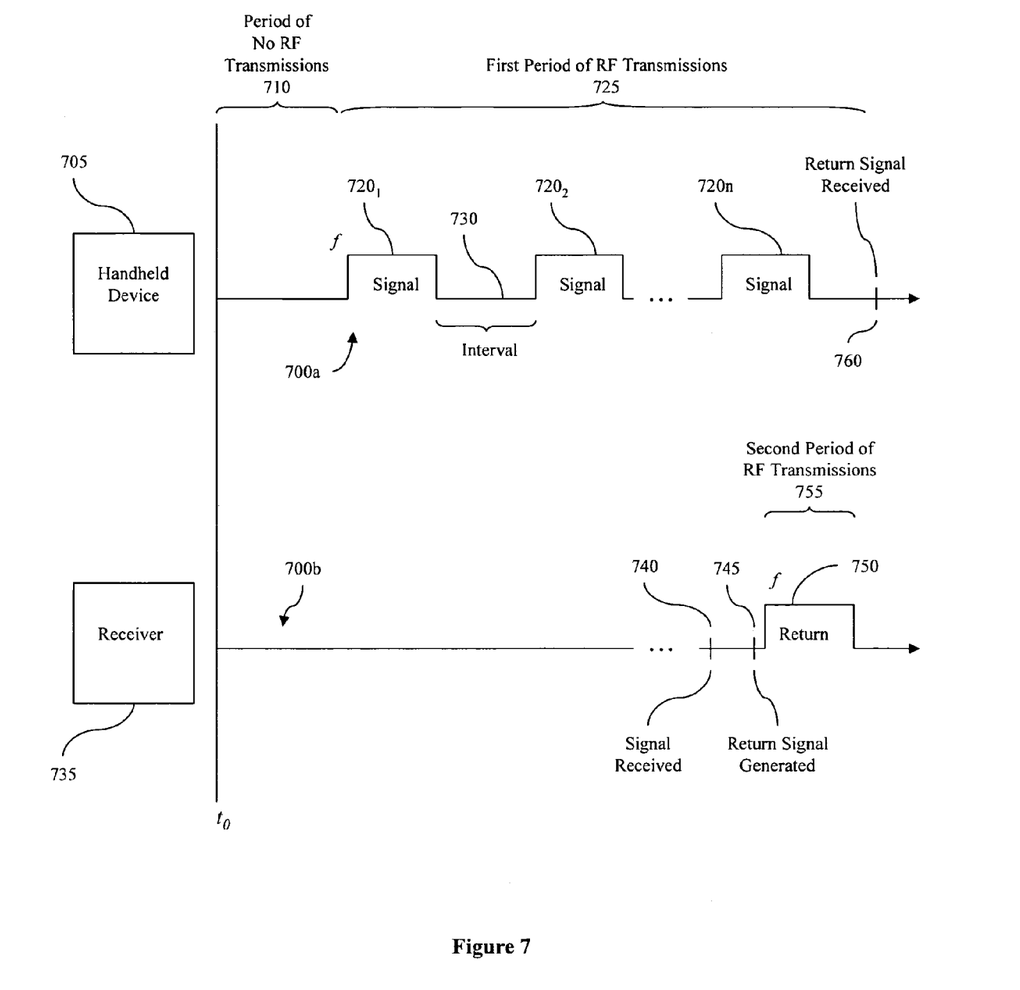
FIG. 7 is a simplified schematic drawing of RF profiles for a handheld device and a receiver in one embodiment of a wireless response system.

FIG. 7 illustrates a simplified schematic drawing of RF profiles 700a of a handheld device 705 in one embodiment of a wireless response system. In alternative embodiments, a plurality of handheld devices are employed. In the illustrated embodiment, the handheld device 705 makes no transmission until it receives a selection from a user. Thus, in RF profile 700a, there is a distinct period of no RF transmission 710. Upon a user entering a selection, the handheld device 705 transmits a first RF signal $720_1$ at a frequency f, thus initiating a first period of RF transmissions 725. The first RF signal $720_1$ includes a user selection and an address, such as a unique address. In one embodiment, the first RF signal $720_1$ lasts for a duration of 100 μs. The duration is a function of the amount and type of data and the frequency f.

After the handheld device 705 transmits the first RF signal $720_1$, the RF profile 700a includes no RF signals for a period equal to a transmission interval 730. The transmission interval 730 may be generated or retrieved from memory, for example, as explained above in reference to FIG. 3. In one embodiment, the transmission interval lasts for a duration of 5 ms. After the transmission interval 730, the RF profile 700a includes additional RF signals $720_{2-n}$. Each RF signal $720_{2-n}$ is identical to the first RF signal $720_1$, and is followed by a transmission interval 730. Thus, in one embodiment, during the first period of RF transmissions 710, there is a transmission frequency of one transmission every 5 ms. In another embodiment, the transmission interval 730 is variable. For example, the transmission interval 730 may be 5 ms after the first RF signal $720_1$, then 5 ms+100 μs after the second RF signal $720_2$, ... and 5 ms+((n−1)*100) μs after the $n^{th}$ RF signal $720_n$.

FIG. 7 further illustrates an RF profile 700b of a receiver 735 in one embodiment of a wireless response system. During the first period of RF transmissions described above, the receiver 735 receives one of the RF signals $720_{1-a}$ transmitted by the handheld device 705, as shown at 740. The receiver 735 makes no transmission until it receives an RF signal (at 710).

Upon receipt of an RF signal at 740, the receiver 735 may identify user selection data and address data in the RF signal and determine whether to accept the user selection data. The receiver 735 then generates return data that includes the address data, as shown at 745. The receiver 735 communicates return data as at least one RF return signal 750 at the frequency f, thus initiating a second period of RF transmissions 755 that overlaps with the first period of RF transmissions 725. In one embodiment, the return signal 750 lasts for a duration of 100 μs.

The receiver 735 transmits a predetermined number of return signals 750 then terminates the second period of RF transmissions 755. In the illustrated embodiment, the receiver 735 transmits a single return signal 750. In another embodiment (not shown), the receiver transmits multiple return signals, wherein each return signal is followed by a predetermined transmission interval or a randomly generated time interval.

Upon receipt of the return signal 750, as shown at 760, the handheld device 705 terminates the first period of RF transmissions 725. Alternatively, if no return signal is received, the handheld device 705 may automatically terminate the first period of RF transmissions 725 after a predetermined time elapses. In one embodiment, the predetermined time limit is eight (8) seconds. In this embodiment, the first period of RF transmissions 725 has a duration of 100 microseconds to eight (8) seconds.

After the first and second periods of RF transmissions 725,755 are terminated, another distinct period of no RF transmissions follows. In an alternative embodiment (not shown), the handheld device 705 may transmit an RF signal at a first frequency and the receiver 735 may transmit an acknowledgment signal at a second frequency.

Figure 8:
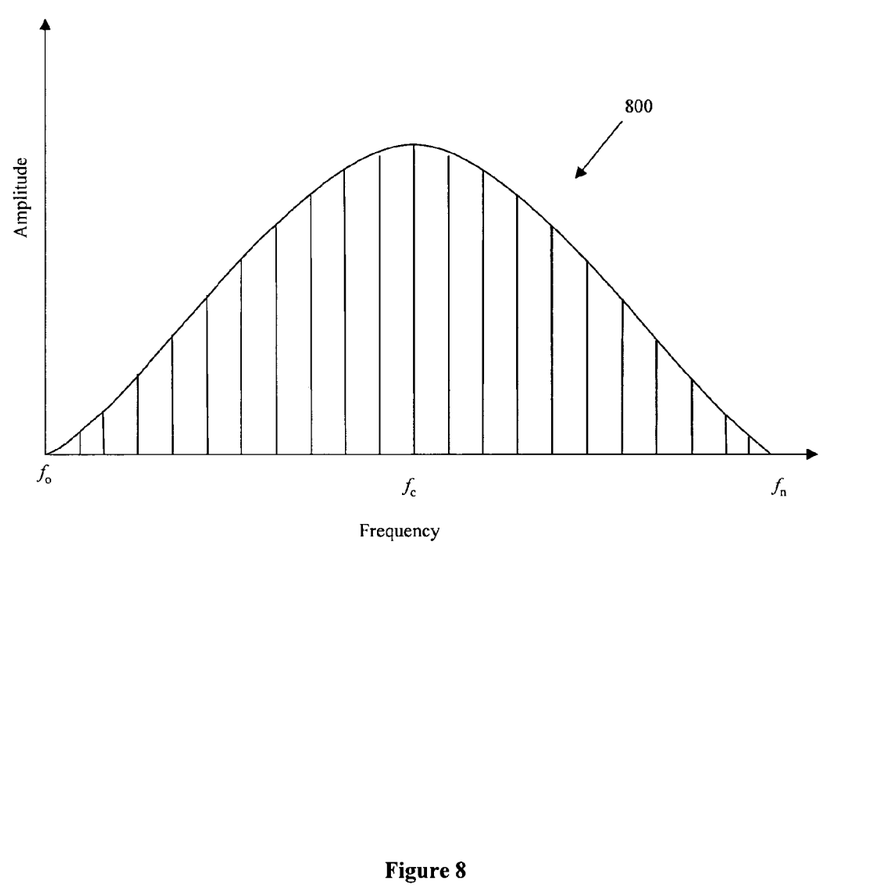
FIG. 8 is a simplified illustration of one embodiment of an RF signal spread on a selected frequency band.

FIG. 8 illustrates one embodiment of an RF signal spread 800 on a selected frequency band. In this embodiment, the RF signal spread 800 covers a range of frequencies from $f_o$ to $f_n$. When a handheld device or a receiver transmits on a selected frequency band, a signal is transmitted that may be centered on a frequency $f_c$ while spread over $f_o$ to $f_n$. The signal is strongest, and therefore has the highest amplitude, on frequency $f_c$ at the center of the frequency band. The signal amplitude decreases at frequencies further from $f_c$, as shown in the illustrated embodiment. Both a handheld device and a receiver may transmit signals over this illustrated RF signal spread, or the handheld device and the receiver may transmit signals centered on different frequencies.

While the present application has been illustrated by the description of embodiments thereof, and while the embodiments have been described in some detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, on the illustrative embodiments shown and described. Accordingly, departures may be made from such details without departing from the spirit or scope of the applicant's general inventive concept.

The invention claimed is:

1. An audience response system comprising:
    a plurality of response units, each response unit including:
        a transceiver,
        an address, and
        logic configured to receive a user selection and, without receiving a wireless signal to initiate transmission, instruct the transceiver to wirelessly transmit a plurality of selection signals, each of the plurality of selection signals encoding the address and the user selection; and
    a base unit including a transceiver configured to wirelessly receive at least one of the plurality of selection signals and wirelessly transmit an acknowledgment signal in response to the receipt.

2. The system of claim 1, wherein the logic of each response unit is further configured to generate a transmission interval, and wherein the response unit enters a non-transmission mode for a duration of time equal to the transmission interval after each wireless transmission of one of the plurality of selection signals.

3. The system of claim 2, wherein the logic of each response unit is further configured to generate a new transmission interval upon receipt of the user selection.

4. The system of claim 2, wherein the transmission interval is a random number.

5. The system of claim 1, wherein each response unit includes a keypad.

6. The system of claim 1, wherein the base unit is further configured to decode each received selection signal into the address and the user selection and to store the user selection.

7. The system of claim 1, wherein the base unit is further configured to decode each received selection signal into the address and the user selection and to send the user selection to an external device.

8. The system of claim 1, wherein the base unit is further configured to make no wireless transmission until a selection signal is received from a response unit.

9. The system of claim 1, wherein the plurality of selection signals are radio frequency signals.

10. A method for wirelessly communicating data representing audience responses in an audience response system having a plurality of response units and at least one base unit, the method comprising:
   receiving a user response;
   asynchronously wirelessly transmitting a plurality of radio frequency signals, each of the plurality of radio frequency signals encoding the user response and a unique identifier;
   terminating the asynchronous wireless transmission; and
   generating a transmission interval and entering a non-transmission mode for a duration of time equal to the transmission interval after each asynchronous wireless transmission of one of the plurality of radio frequency signals.

11. The method of claim 10, wherein the terminating occurs upon receiving an acknowledgment radio frequency signal from the at least one base unit.

12. The method of claim 11, wherein the plurality of radio frequency signals and the acknowledgment radio frequency signal are transmitted at a same frequency.

13. The method of claim 11, wherein the plurality of radio frequency signals and the acknowledgment radio frequency signal are transmitted at different frequencies.

14. The method of claim 10, wherein the terminating occurs after a predetermined interval.

15. A method for wirelessly receiving data representing audience responses in an audience response system having a plurality of response units and at least one base unit, the method comprising:
   initiating a start up sequence;
   entering a non-transmission mode upon completion of the start up sequence;
   remaining in the non-transmission mode until a wireless signal having data representing a user response and data representing an address is wirelessly received;
   decoding the wireless signal into data representing the user response and data representing the address;
   generating an acknowledgment signal encoding the data representing the address; and
   wirelessly transmitting the acknowledgment signal.

16. The method of claim 15, further comprising:
   re-entering the non-transmission mode;
   remaining in the re-entered non-transmission mode until an additional wireless signal having data representing an additional user response and data representing an address is wirelessly received;
   decoding the additional wireless signal into data representing the additional user response and data representing the address;
   generating an additional acknowledgment signal encoding the data representing the address; and
   wirelessly transmitting the additional acknowledgment signal.

17. The method of claim 15, further comprising storing the data representing the user response.

18. The method of claim 15, further comprising displaying the data representing the user response.

19. The method of claim 15, further comprising sending the data representing the user response to an external device.

* * * * *